US 6,665,922 B2

(12) United States Patent
Schultz

(10) Patent No.: US 6,665,922 B2
(45) Date of Patent: Dec. 23, 2003

(54) PULL STEM HI-LITE PIN WITH PULL GROOVE FOR SWAGING COLLARS

(75) Inventor: Dennis Schultz, San Juan Capistrano, CA (US)

(73) Assignee: Hi-Shear Corporation, Torrance, CA (US)

(*) Notice: Subject to any disclaimer, the term of this patent is extended or adjusted under 35 U.S.C. 154(b) by 0 days.

(21) Appl. No.: 10/145,588

(22) Filed: May 13, 2002

(65) Prior Publication Data

US 2003/0210969 A1 Nov. 13, 2003

(51) Int. Cl.[7] .............................. B23P 11/00; F16B 19/00
(52) U.S. Cl. .................. 29/525.02; 29/525.06; 411/43; 411/361
(58) Field of Search ..................... 411/43, 69, 70, 411/3–5, 361; 29/525.02, 525.06

(56) References Cited

U.S. PATENT DOCUMENTS

| D191,883 S | 12/1961 | Wing |
| 3,915,052 A | * 10/1975 | Ruhl .................. 411/361 |
| RE30,445 E | 12/1980 | Ruhl |
| 4,326,825 A | 4/1982 | Volkmann et al. |
| 4,408,936 A | 10/1983 | Williamson |
| 4,485,510 A | 12/1984 | Hatter |
| 4,865,499 A | * 9/1989 | Lacey ................ 411/361 X |
| 4,957,401 A | 9/1990 | Hatter |
| 5,049,016 A | 9/1991 | Nordyke |
| 5,125,778 A | 6/1992 | Sadri |
| 5,171,115 A | 12/1992 | McWilliams et al. |
| 5,315,755 A | 5/1994 | Fulbright et al. |
| 5,548,889 A | 8/1996 | Smith et al. |
| 5,604,968 A | 2/1997 | Fulbright et al. |
| 6,014,801 A | 1/2000 | Wilcox |
| 6,095,733 A | 8/2000 | Busby et al. |
| 6,233,802 B1 | 5/2001 | Fulbright |

* cited by examiner

*Primary Examiner*—Neill Wilson
(74) *Attorney, Agent, or Firm*—Fulwider Patton Lee & Utecht, LLP

(57) ABSTRACT

A fastener for installation into a workpiece which may be installed by either a swaging operation or a torquing operation. The fastener includes an enlarged protruding head which is proximal to a substantially cylindrical smooth shank portion. A threaded shank portion positioned distal to the smooth shank portion includes a male thread which is sufficiently strong to have a swage collar swaged onto it. Distal to the threaded shank portion is a pin tail portion having a surface which is configured to engage a tool. Positioned between the threaded shank portion and the pin tail portion is a breakneck groove having a lower tensile strength than any other portion of the fastener. The tensile strength of the breakneck groove is controlled such that the fastener severs within the breakneck groove when a preset range of tension is applied to the pin tail portion by the tool.

3 Claims, 4 Drawing Sheets

PULL STEM HI-LITE PIN WITH PULL
GROOVE FOR SWAGING COLLARS

BACKGROUND OF THE INVENTION

1. Field of the Invention

This invention relates generally to fasteners, and more particularly relates to pull stem fasteners which can have either a collar swaged onto them or a female threaded device, such as a threaded nut or a threaded collar, torqued onto them.

2. Description of the Related Art

Fasteners of the type used in the aerospace industry, include those that are installed by a swaging operation and those that have a female threaded device, such as a threaded nut or a threaded collar, torqued onto them. Swaging is a process for reducing the cross-sectional area of a part by using a hammer-type or ram-type of tool to apply compressive forces to the outside surface of the part. Swaging operations for a fastener include sliding a swage collar over a portion of a fastener having a series of lock grooves. The swage collar includes an inside surface which is typically smooth and sufficiently large to fit over the lock grooves of the fastener with a clearance fit. The swage collar also includes sufficient thickness so that when the swaging operation is performed, material from the swage collar can be forced into the lock grooves on the fastener, thereby locking the swage collar to the fastener. Since the swage collar material must be forced into the lock grooves, the swage collar material is typically softer than the material incorporated in the lock grooves.

Fasteners which are installed by a swaging operation generally include those having a pull stem portion and those which do not have a pull stem portion. Fasteners having the pull stem portion include a pin having an enlarged protruding head at a proximal end of the fastener. The head includes a distal surface which contacts a surface of a workpiece. Distal the head is a smooth shank portion which is adapted to be received within substantially aligned holes within a series of workpieces. The smooth shank portion may provide either a clearance fit or an interference fit with the aligned holes in the workpiece. Distal the smooth shank portion is a lock shank portion having a plurality of circumferentially extending annular lock grooves. Alternatively, some pins include lock grooves having a helical pattern rather than the annular pattern. The lock grooves are configured to engage a swage collar through a swage operation. Distal the lock shank portion is a pull stem portion which may be separated from the lock shank portion by a breakneck groove.

To install the pin, the pull stem portion is inserted into the aligned holes within the series of workpieces until it protrudes from the hole on the opposite side of the workpiece. For pins having an interference fit at the smooth shank portion, a tool is used to pull the smooth shank portion into the hole by pulling on the pull stem portion until a distal surface on the head contacts a surface of the workpiece. Having an interference fit, the pin is retained within the workpiece by compressive forces from at least one of the aligned holes applied to the smooth shank portion. At this point, the tool may continue to pull on the pull stem portion until a sufficient tensile force is attained to sever the pull stem portion from the remainder of the pin at the breakneck groove. Then the swage collar may be slid over the lock shank portion and swaged into place.

To install a pin having a smooth shank portion which provides a clearance fit, the pull stem portion is inserted into the aligned holes and advanced through the hole until the distal surface of the head contacts a surface of the workpiece. The swage collar may then be slid over the lock shank portion preparatory to the swaging operation. The tool may apply a light tensile load on the pull stem portion during the swaging operation to hold the pin in place. Alternatively, to have the pin remain in tension after the swaging operation, the tool may apply a relatively high tensile load on the pull stem portion during the swaging operation, thereby locking the fastener in a preloaded condition. After the swage collar is swaged onto the lock grooves, the pull stem portion may be pulled in tension further until it severs from the remainder of the pin at the breakneck groove.

Fasteners which are installed by a swaging operation that do not include a pull stem portion include a pin having an enlarged protruding head, a smooth shank portion and a lock shank portion. As with the fasteners which include a pull stem portion, the smooth shank portion is adapted to be received within aligned holes within a series of workpieces and may provide either a clearance fit or an interference fit. Also similar to the fasteners which include the pull stem portion, the lock shank portion may include either a plurality of circumferentially extending annular lock grooves or lock grooves having a helical pattern.

To install a fastener which includes a smooth shank portion having an interference fit and no pull stem portion, the lock shank portion is inserted into the aligned holes within the series of workpieces from one side until it protrudes from the opposite side of the workpieces. A tool may be used to pull the smooth shank portion into the aligned holes by pulling on the lock shank portion until the distal surface of the head contacts the workpiece. The pin is retained within the workpiece by compressive forces of at least one of the aligned holes applied to the smooth shank portion. With the pin thus retained, the swage collar may be slipped over the lock grooves and a tool may then swage the collar onto the lock grooves of the lock shank portion.

Fasteners which include a smooth shank portion having a clearance fit and no pull stem portion may include a threaded hole on a surface at the distal end of the fastener, or some other means through which the tool may engage the lock shank portion of the pin in order to retain the pin for the swage operation. To install such a fastener, the lock shank portion is inserted into the aligned holes within the series of workpieces from one side until it protrudes from the opposite side of the workpieces and the distal surface of the head contacts the workpiece. The swage collar may then be slid over the lock shank portion preparatory to the swaging operation. The tool may apply a light tensile load to the pin through the threaded hole or other tool engagement means during the swaging operation to hold the pin in place. Alternatively, to have the pin remain in tension after the swaging operation, the tool may apply a relatively high tensile load through the threaded bole or other engagement means during the swaging operation, thereby locking the fastener in a preloaded condition.

Fasteners which are installed by having a threaded nut or a threaded collar torqued onto them also include those having a pull stem portion and those which do not have a pull stem portion. Fasteners having the pull stem portion include a pin having an enlarged protruding head at a proximal end of the fastener and having a distal surface which contacts a surface of a workpiece. Adjacent the head is a smooth shank portion which is adapted to be received within the aligned holes within the series of workpieces. The smooth shank portion may provide either a clearance fit or an interference fit with the aligned holes in the workpiece.

Distal the smooth shank portion is a threaded shank portion which may include a standard thread for receiving a threaded nut or a threaded collar. Distal the threaded shank portion is a pull stem portion which may be separated from the threaded shank portion by a breakneck groove.

Installing the pin which is configured to have a threaded nut or a threaded collar torqued onto it and having a pull stem portion is similar to installing the pin which is configured to be installed through a swaging operation which includes a pull stem portion. The pull stem portion is inserted into the aligned holes within the workpiece until it protrudes from the opposite side of the workpiece. For pins having an interference fit at the smooth shank portion, a tool is used to pull the smooth shank portion into the aligned holes by pulling on the pull stem portion until the distal surface on the head contacts a surface of the workpiece. Having an interference fit, the pin is retained within the workpiece by compressive forces from at least one of the aligned holes applied to the smooth shank portion. The tool may continue to pull on the pull stem portion until a sufficient tensile force is attained to sever the pull stem portion from the remainder of the pin at the breakneck groove. Then, the threaded nut or the threaded collar may be torqued onto the threaded shank portion of the pin.

To install the threaded pin having a smooth shank portion which provides a clearance fit, the pull stem portion is inserted into the aligned holes and advanced through the aligned holes until the distal surface of the head contacts a surface of the workpiece. The threaded nut or threaded collar may then be slid over the pull stem portion. Then, while applying a light tensile load onto the pull stem portion, the threaded nut or threaded collar may be torqued onto the threaded shank portion. Alternatively, to place the fastener in a preload condition, the tool may apply a relatively high tensile load on the pull stem portion during the torquing operation. After the threaded nut or threaded collar is torqued onto the threaded shank portion, the pull stem portion may be pulled in tension further until it severs from the remainder of the pin at the breakneck groove.

Fasteners which are installed by having a threaded nut or a threaded collar torqued onto them that do not include a pull stem portion include a pin having an enlarged protruding head, a smooth shank portion and a threaded shank portion. As with the fasteners which include a pull stem portion, the smooth shank portion is adapted to be received within aligned holes within a series of workpieces and may provide either a clearance fit or an interference fit.

To install the threaded pin which includes a smooth shank portion having an interference fit and no pull stem portion, the threaded shank portion is inserted into the aligned holes within the series of workpieces from one side until it protrudes from the opposite side of the workpiece. A tool may be used to pull the smooth shank portion into the aligned holes by pulling on the threaded shank portion until the distal surface of the head contacts the workpiece. The pin is retained within the workpiece by compressive forces of at least one of the aligned holes applied to the smooth shank portion. With the pin thus retained, the threaded nut or threaded collar may be torqued onto the threads of the threaded shank portion.

Threaded pins which include a smooth shank portion having a clearance fit and no pull stem portion may include a threaded hole on a surface at the distal end of the fastener, or some other means through which the tool may engage the threaded shank portion of the pin in order to retain the pin for the torquing operation. To install these fasteners, the threaded shank portion is inserted into the aligned holes within the series of workpieces from one side until it protrudes from the opposite side of the workpiece and the distal surface of the head contacts the workpiece. The threaded nut or threaded collar may then be torqued onto the threaded shank portion. To torque the threaded nut or threaded collar onto the pin, the tool may apply a light tensile load to the pin through the threaded hole or other tool engagement means to hold the pin in place. Alternatively, to place the pin in a preloaded condition, the tool may apply a relatively high tensile load through the threaded hole or other engagement means during the torquing operation.

As both fasteners which are installed by a swaging operation and fasteners which are installed by having a threaded nut or a threaded collar torqued onto them are popular in industry, such as the aircraft industry, manufacturers inventory both types of fasteners. Inventorying and using multiple types of fasteners adds significant costs to the production of aircraft. Hence, those skilled in the art have recognized a need for a fastener which can be used with multiple installation means so that the quantity of fastener types used by aircraft manufactures can be reduced.

SUMMARY OF THE INVENTION

Briefly, and in general terms, the present invention is directed to a fastener which can be installed into a workpiece by either swaging or torquing methods so that the types of fasteners used by manufacturers can be reduced.

In one currently preferred aspect of the invention, the fastener includes an enlarged protruding head which is substantially centered about a longitudinal axis and positioned at a proximal end of the fastener. The fastener also includes a substantially cylindrical smooth shank portion which is positioned distal and adjacent the head and substantially centered about the longitudinal axis. The smooth shank portion includes a first diameter. A threaded shank portion distal to the smooth shank portion and is substantially centered about the longitudinal axis. The threaded shank portion includes a male thread which is sufficiently strong to have a swage collar of a softer material swaged onto it without appreciable damage to the threads. The male thread has a second diameter smaller than the first diameter of the smooth shank portion. The fastener also includes a pin tail portion. The pin tail portion is positioned distal to the threaded shank portion and is substantially centered about the longitudinal axis. The pin tail portion includes means for a tool to engage the pin tail portion and pull the fastener in tension. The pin tail portion also includes a third diameter which is smaller than the second diameter of the threaded shank portion. Further, a swage collar or a female threaded device which is intended to be engaged with the threaded shank portion of the fastener fits over the pin tail portion without any interference. The fastener also includes a breakneck groove which includes a fourth diameter which is smaller than the third diameter of the pin tail portion and is positioned between the threaded shank portion and the pin tail portion and substantially centered about the longitudinal axis. The breakneck groove is controlled to ensure that the breakneck groove includes a lower tensile strength than any other portion of the fastener and that the fastener will sever at the breakneck groove when a preset range of tension is applied to the fastener at the pin tail portion.

In a detailed aspect of the currently preferred embodiment of the invention, the length of the smooth shank portion is sufficient to protrude from a surface on a second side of the at least one workpiece while a distal surface of the head is in contact with a surface on a first side of the at least one workpiece. In another currently preferred embodiment, the length of the smooth shank portion is insufficient to protrude from a surface on a second side of the at least one workpiece while the distal surface of the head is in contact with a surface on a first side of the at least one workpiece. The means for the tool to engage the pin tail portion may include a plurality of circumferentially extending annular grooves. In a further currently preferred embodiment, the tensile strength of the breakneck groove is controlled through the fourth diameter of the breakneck groove and the strength of the fastener material in the region of the breakneck groove. In an additional currently preferred embodiment, the breakneck groove includes a first conically tapered surface which tapers distally from the threaded shank portion toward the longitudinal axis of the fastener. The breakneck groove also includes a second conically tapered surface which tapers proximally from the pin tail portion toward the longitudinal axis of the fastener. A substantially circumferential intersection is positioned between the first and second conically tapered surfaces. Further, a radius having a controlled dimension is positioned at the intersection of the first conically tapered surface and the second conically tapered surface.

In a second currently preferred aspect of the invention, the fastener may be installed through a swaging operation. The method for installing the fastener by swaging includes providing the fastener and at least one workpiece. The at least one workpiece includes a hole therethrough which provides a clearance fit with the smooth shank portion of the fastener. The pin tail portion of the fastener is inserted into the hole within the at least one workpiece from a first side of the at least one workpiece. The fastener is advanced distally until the pin tail portion protrudes from a surface on a second side of the at least one workpiece and the distal surface of the head of the fastener contacts a surface on the first side of the at least one workpiece. A further step includes providing a swage collar which includes a substantially smooth interior surface and provides a clearance fit between the swage collar and the threaded shank portion. The swage collar is slid proximally over the pin tail portion and threaded shank portion of the fastener until the swage collar is positioned proximate the second side of the at least one workpiece. A tool engages the pin tail portion and pulls the fastener distally in tension. The tool also pushes the swage collar proximally against the second side of the at least one workpiece and swages the swage collar onto the threaded shank portion of the fastener until the swage collar substantially fills the threads on the threaded shank portion. With the swage collar swaged onto the threaded shank portion of the fastener, the tool increases tension at the pin tail portion of the fastener until the preset range of tension has been attained and the fastener severs at the breakneck groove.

In a third currently preferred aspect of the invention, the fastener may be installed through a torquing operation. This method includes providing the fastener and at least one workpiece. The at least one workpiece includes a hole therethrough which provides a clearance fit with the smooth shank portion of the fastener. The pin tail portion of the fastener is inserted into the hole within the at least one workpiece from a first side of the at least one workpiece. The fastener is advanced distally until the pin tail portion protrudes from a surface on a second side of the at least one workpiece and the distal surface of the head of the fastener contacts a surface on the first side of the at least one workpiece. A further step includes providing the female threaded device and sliding the female threaded device proximally over the pin tail portion. A tool engages the pin tail portion and pulls the fastener distally in tension while preventing the fastener from turning. The tool also torques the female threaded device onto the threaded shank portion until a desired torsional load is attained. With the female threaded device torqued onto the fastener, the tool increases the tension at the pin tail portion of the fastener until the preset range of tension has been attained and the fastener severs at the breakneck groove.

In a fourth currently preferred aspect of the invention, the fastener may be installed through a torquing operation. This method includes providing the fastener and at least one workpiece. The at least one workpiece includes a hole therethrough which provides an interference fit with the smooth shank portion of the fastener. The pin tail portion of the fastener is inserted into the hole within the at least one workpiece from a first side of the at least one workpiece and advanced distally until the pin tail portion protrudes from a surface on a second side of the at least one workpiece. A tool engages the pin tail portion and pulls the smooth shank portion of the fastener distally into the hole within the at least one workpiece until the distal surface of the head of the fastener contacts a surface on the first side of the at least one workpiece. The tool increases tension at the pin tail portion of the fastener until the preset range of tension has been attained and the fastener severs at the breakneck groove. A further step includes providing the female threaded device. The female threaded device is torqued onto the threaded shank portion through the use of the tool until a desired torsional load is attained.

From the above, it may be seen that the invention provides for a configuration of a fastener which can be installed through either a swaging operation or a torquing operation. Further, the invention includes installation methods using swaging operations and torquing operations. These and other aspects and advantages of the invention will become apparent from the following detailed description and the accompanying drawings, which illustrate by way of example the features of the invention.

DETAILED DESCRIPTION OF THE PREFERRED EMBODIMENTS

Figure 1:
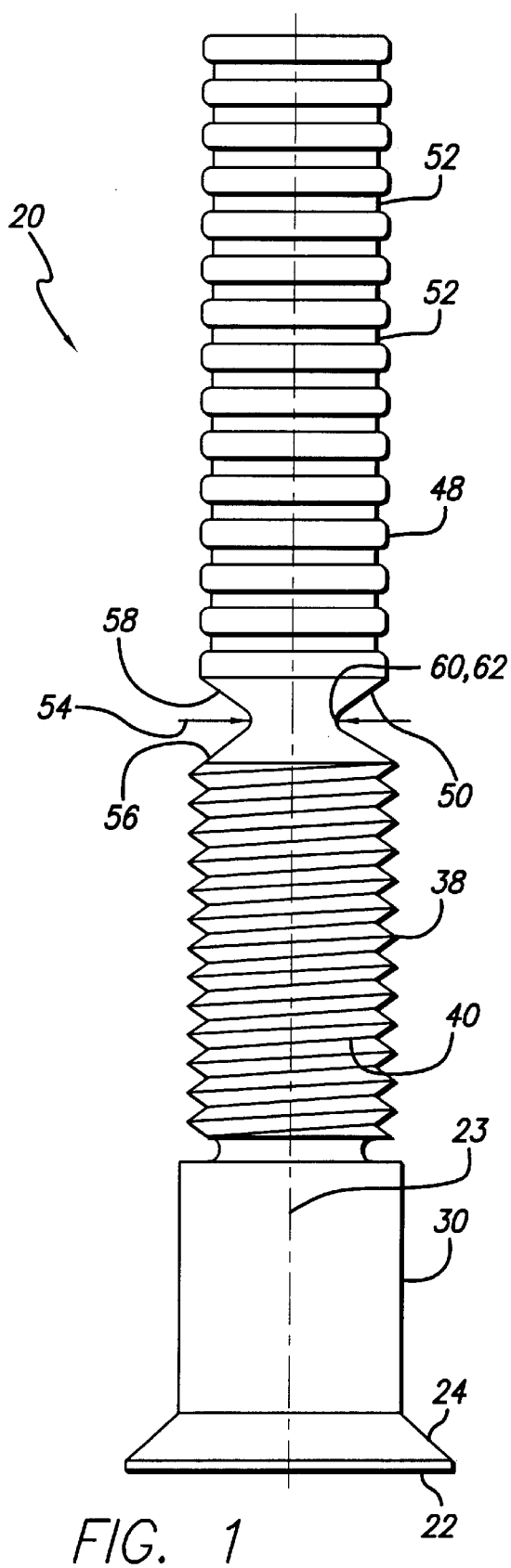
FIG. 1 is a plan view depicting an embodiment of the fastener of the present invention.

As shown in the drawings for purposes of illustration, the invention is embodied in a fastener having a threaded shank portion and a pull stem portion. The fastener may be installed into at least one workpiece either by having a collar swaged onto the threaded shank portion or a female threaded device, such as a threaded nut or threaded collar, torqued onto the threaded shank portion. Referring to the drawings, in which like reference numerals are used to designate like or corresponding elements among the several figures, FIG.

Figure 2:
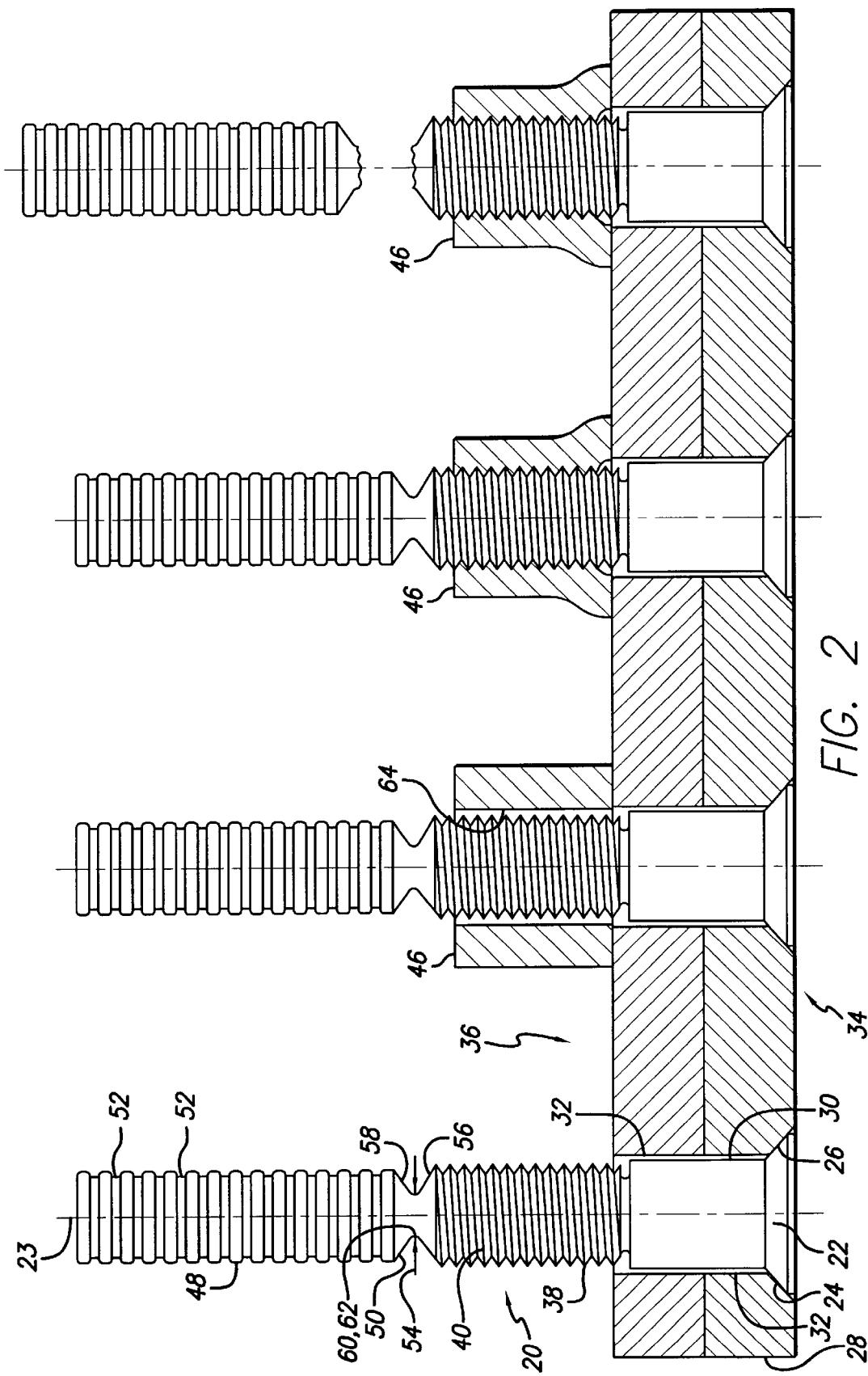
FIG. 2 is a plan view, partially in cross-section, depicting the fastener of FIG. 1 in sequential steps of installation via a swaging operation.

1 depicts a pull stem fastener 20 of the present invention. The fastener 20 includes an enlarged protruding head 22 which is substantially centered about a longitudinal axis 23 of the fastener and positioned at a proximal end of the fastener. The head may include a distal surface 24 which is adapted to contact a surface 26 of a workpiece 28 (FIG. 2). Although FIG. 1 depicts a head 22 having a flush configuration, the invention is not limited to such configurations and may include other head configurations which are well known in the art.

Adjacent and distal to the head 22 and substantially centered about the longitudinal axis 23 is a substantially cylindrical smooth shank portion 30 having a first diameter. As used herein, the term "adjacent" means "near" or "close to," and is therefore not limited to "adjoining." The smooth shank portion 30 is configured to be received within substantially aligned holes 32 (FIG. 2) within a series of workpieces 28 from a first side 34 of the series of the workpieces. The substantially aligned holes 32 in the series of workpieces 28 may provide either a clearance fit (FIGS. 2 and 3) or an interference fit (FIG. 4) with the smooth shank portion 30 of the fastener 20. When an interference fit (FIG. 4) is desired, at least one of the aligned holes 32 in the series of workpieces 28 is required to provide an interference fit. The smooth shank portion 30 may be configured to various lengths. In one embodiment, the length of the smooth shank portion 30 is sufficient to protrude from a surface on a second side 36 of the series of workpieces 28 while the distal surface 24 on the head 22 of the fastener 20 is in contact with a surface 26 on the first side 34 of the series of workpieces. However, in another embodiment, the length of the smooth shank portion 30 is insufficient to protrude from the surface on the second side 36 of the series of workpieces 28 when the distal surface 24 of the head 22 is in contact with the surface 26 on the first side 34 of the series of workpieces. The smooth shank portion 30 may be formed by manufacturing methods that are well known in the art, such as by forging or machining.

Distal to the smooth shank portion 30 and substantially centered about the longitudinal axis 23 is a threaded shank portion 38 having a standard male thread 40 configuration for receiving a female threaded device 41 (FIGS. 3 and 4), such as a threaded nut 42 or a threaded collar 44. The threaded shank portion 38 includes a second diameter. To facilitate installation of the fastener 20 into an interference fit hole, the second diameter of the threads 40 is less than the first diameter of the smooth shank portion 30 such that there is a clearance fit between the threaded shank portion 38 and the substantially aligned holes 32 within the series of workpieces 28. The threads 40 of the threaded shank portion 38 are sufficiently strong to withstand having a swage collar 46 (FIG. 2) of a softer material swaged onto them without appreciable deformation to the threads. To obtain threads 40 of sufficient strength, the fastener 20 may be hardened, such as by a heat treatment process or other techniques which are well known in the art. Alternatively, the fastener 20 may be fabricated from a material which is sufficiently stronger than the swage collar 46 material to withstand the swaging operation. The threads 40 may be formed by manufacturing methods that are well known in the art, such as by machining on a lathe or by thread rolling. Thread rolling is a process in which the portion of the fastener which is to be threaded is placed between dies having thread-shaped ridges which sink into the fastener and displace the fastener material. The fastener is rolled between the dies to form the thread around the full circumference of the fastener.

Distal to the threaded shank portion 38 and substantially centered about the longitudinal axis 23 is a pin tail portion 48 which may be separated from the threaded shank portion by a breakneck groove 50. In one embodiment, the pin tail portion 48 includes a plurality of circumferentially extending annular grooves 52 which permit a tool (not shown) to engage the pin tail portion and pull the fastener 20 in tension. The grooves 52 in the pin tail portion 48 may be formed by methods that are well known in the art, such as by machining, forging or rolling. The pin tail portion 48 includes a third diameter which is sufficiently small that a swage collar 46 or female threaded device 41 which is intended to be engaged with the threaded shank portion 38 of the fastener may slide over the pin tail portion without any interference with the pin tail portion.

The breakneck groove 50 between the threaded shank portion 38 and the pin tail portion 48 is substantially centered about the longitudinal axis 23 and includes a fourth diameter which is smaller than the third diameter of the pin tail portion 48 and is sized to ensure that the breakneck groove has a lower tensile strength than any other portion of the fastener 20. The tensile strength of the breakneck groove 50 is controlled to ensure that the fastener 20 will sever at the breakneck groove when a preset range of tension is applied to the fastener at the pin tail portion 48. The tensile strength of the breakneck groove 50 is controlled through the fourth diameter 54 of the breakneck groove and the strength of the fastener material in the region of the breakneck groove. In one embodiment, the breakneck groove 50 may include a first conically tapered surface 56 which tapers distally from the threaded shank portion 38 toward the longitudinal axis 23 of the fastener 20. A second conically tapered surface 58 which tapers proximally from the pin tail portion 48 toward the longitudinal axis 23 of the fastener 20 may also be included. The first 56 and second 58 conically tapered surfaces of the breakneck groove 50 are angled such that there is a substantially circumferential intersection 60 therebetween. The circumferential intersection 60 may include a radius 62 of a controlled dimension to facilitate the control of the tensile strength of the fastener 20 within the breakneck groove 50.

FIG. 2 depicts the installation of a fastener 20 through a swaging operation in which the fastener is installed into at least one workpiece 28 via a hole 32 therethrough which provides a clearance fit with the smooth shank portion 30 of the fastener. To install the fastener 20 through a swaging operation, the swage collar 46 is swaged onto the threaded shank portion 38 of the fastener. The swage collar 46 may include a substantially smooth interior surface 64 and an interior diameter which provides a clearance between the swage collar and the threaded shank portion 38. The swage collar 46 may be made from a material which is sufficiently malleable to be driven into the threads 40 of the threaded shank portion 38 of the fastener 20 without causing appreciable deformation to the threads, and sufficiently strong to remain in place following the swaging operation.

The installation method for the fastener 20 through the use of the swaging process includes inserting the pin tail portion 48 of the fastener into the hole 32 within the at least one workpiece 28 from the first side 34 of the at least one workpiece. The fastener 20 is advanced distally until the pin tail portion 48 protrudes from the surface on the second side 36 of the at least one workpiece 28 and the distal surface 24 on the head 22 of the fastener contacts the surface 26 on the first side 34 of at least one workpiece. The at least one workpiece 28 is depicted as two workpieces stacked adjacent each other for purposes of illustration, although more workpieces may be included. The installation method also includes sliding the swage collar 46 proximally over the pin tail portion 48 and threaded shank portion 38 of the fastener 20 until it is proximate the second side 36 of the at least one workpiece 28. A tool (not shown) engages the pin tail portion 48 and pulls the fastener 20 distally in tension. With the fastener 20 in tension, the tool may push the swage collar 46 proximally against the second side 36 of the at least one workpiece 28 and swages the swage collar onto the threaded shank portion 38 of the fastener so that the swage collar substantially fills the threads 40 on the fastener. With the swage collar 46 swaged onto the threaded shank portion 38 of the fastener 20, the tool increases tension at the pin tail portion 48 until the preset range of tension has been attained and the fastener severs at the breakneck groove 50, thereby removing the pin tail portion from the remainder of the fastener.

Figure 3:
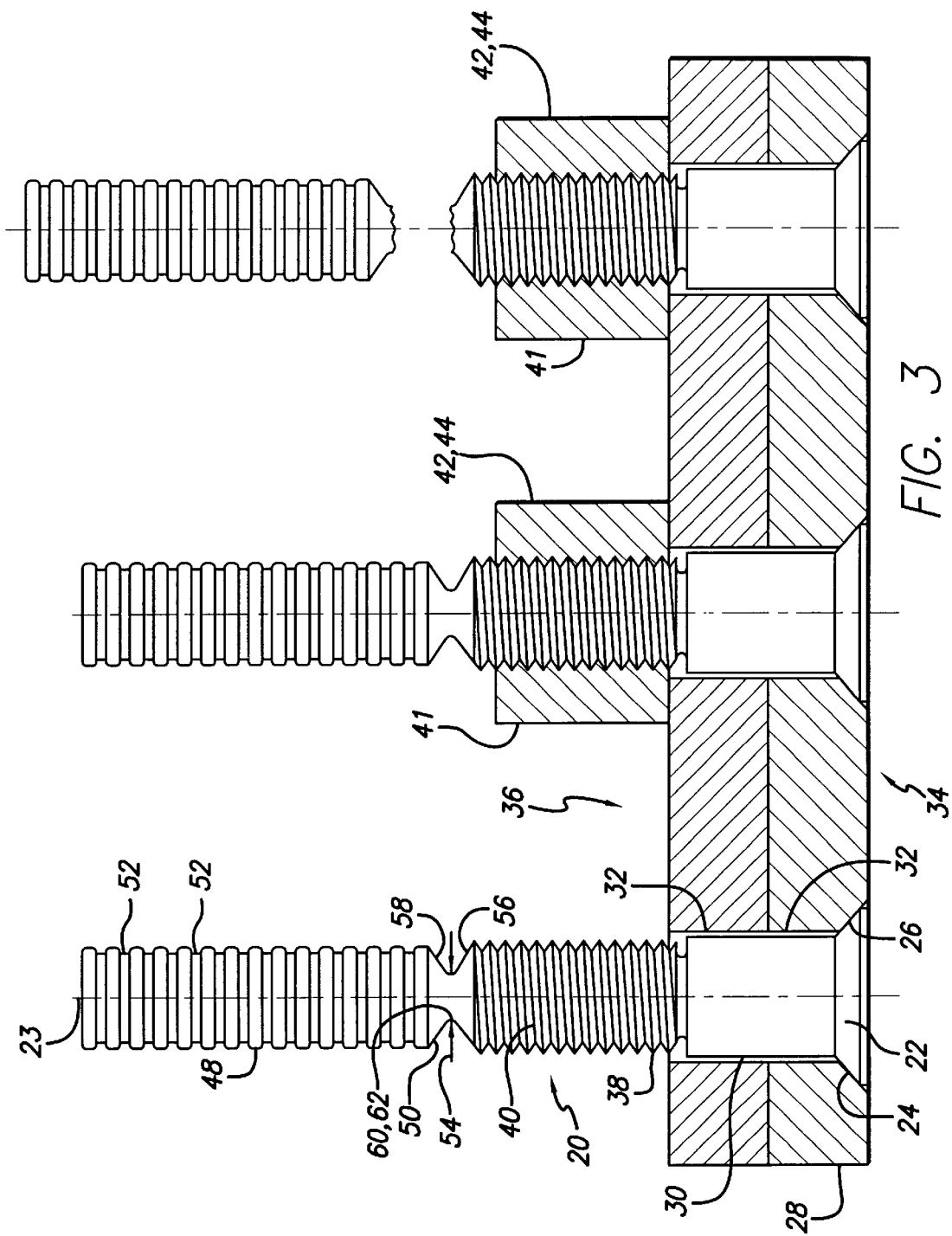
FIG. 3 is a plan view, partially in cross-section, depicting the fastener of FIG. 1 in sequential steps of installation with a threaded nut.

FIG. 3 depicts the installation of a fastener 20 through a torquing operation. In this installation, the fastener is installed into at least one workpiece 28 via a hole 32 therethrough which provides a clearance fit with the smooth shank portion 30 of the fastener. The installation method includes inserting the pin tail portion 48 of the fastener 20 into the hole 32 within the at least one workpiece 28 from the first side 34 of the at least one workpiece. The fastener 20 is advanced distally until the pin tail portion 48 protrudes from the surface on the second side 36 of the at least one workpiece 28 and the distal surface 24 on the head 22 of the fastener contacts the surface 26 on the first side of the at least one workpiece. The at least one workpiece 28 is depicted as two workpieces stacked adjacent each other for purposes of illustration, although more workpieces may be included. The female threaded device 41, such as the threaded nut 42 or the threaded collar 44, is slid proximally over the pin tail portion 48. A tool (not shown) engages the pin tail portion 48 and may pull the fastener 20 distally in tension and prevent the fastener from turning while simultaneously torquing the female threaded device 41 onto the threaded shank portion 38 until a desired torsional load is attained. With the female threaded device 41 torqued onto the threaded shank portion 38 of the fastener 20, the tool increases tension at the pin tail portion 48 until the preset range of tension has been attained and the fastener severs at the breakneck groove 50, thereby removing the pin tail portion from the remainder of the fastener.

Figure 4:
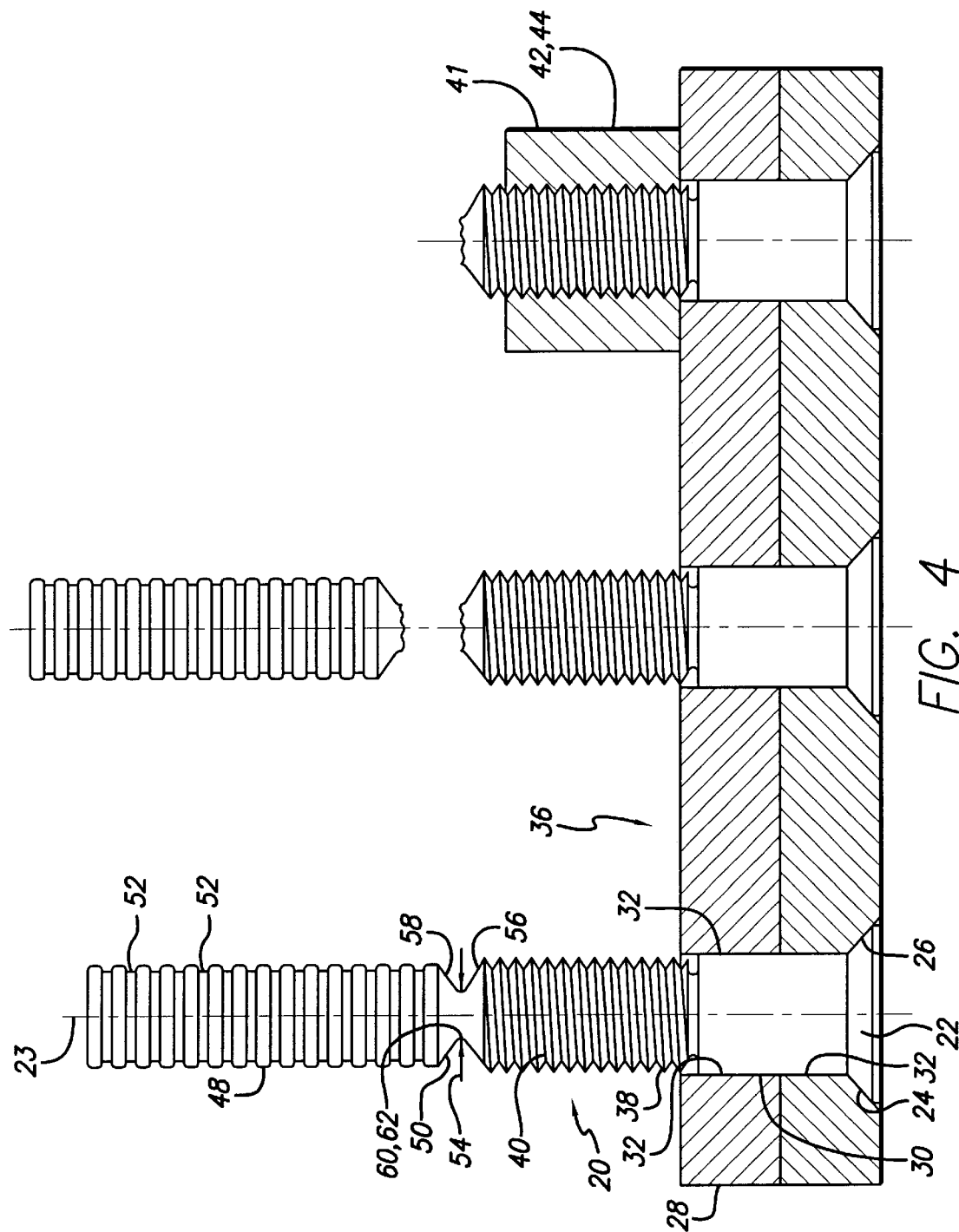
FIG. 4 is a plan view, partially in cross-section, depicting the fastener of FIG. 1 in sequential steps of installation with a threaded nut.

FIG. 4 depicts another installation of a fastener 20 through a torquing operation. In this installation, however, the fastener is installed into the at least one workpiece 28 via a hole 32 therethrough which provides an interference fit with the smooth shank portion 30 of the fastener. The installation method includes inserting the pin tail portion 48 of the fastener 20 into the hole 32 within the at least one workpiece 28 from the first side 34 of the series of fasteners. The fastener 20 is advanced distally until the pin tail portion 48 protrudes from the surface on the second side 36 of the at least one workpiece. The at least one workpiece 28 is depicted as two workpieces stacked adjacent each other for purposes of illustration, although more workpieces may be included. A tool (not shown) engages to the pin tail portion 48 and pulls the fastener 20 distally until the smooth shank portion 30 of the fastener is engaged with the hole 32 within the at least one workpiece 28 and the distal surface 24 of the head 22 of the fastener contacts the surface 26 on the first side 34 of the at least one workpiece. The tool may continue to pull distally on the pin tail portion 48 until the preset range of tension has been attained and the fastener 20 severs at the breakneck groove 50, thereby removing the pin tail portion from the remainder of the fastener. Having an interference fit with the at least one workpiece 28, the fastener 20 is retained within the at least one workpiece by compressive forces from the interference fit hole 32 applied to the smooth shank portion 30. In configurations where the at least one workpiece 28 includes a series of workpieces stacked adjacent each other, the holes in each workpiece are substantially aligned. At least one of the substantially aligned holes 32 provides an interference fit with the smooth shank portion 30 of the fastener 20. With the fastener 20 thus retained, the female threaded device 41, such as the threaded nut 42 or threaded collar 44, may be torqued onto the threaded shank portion 38 of the fastener.

From the foregoing, it will be appreciated that aspects of an embodiment of the present invention permit fasteners of a single design to be installed through either a swaging or a torquing technique. By using the same fastener design for both swaging installations and torquing installations, manufacturers can reduce the quantity of fastener types which are maintained in inventory, thereby reducing inventory and production costs.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed:

1. A method of installing a fastener into at least one workpiece, comprising:
    providing a fastener having,
        an enlarged protruding head positioned at a proximal end of the fastener and substantially centered about a longitudinal axis,
        a substantially cylindrical smooth shank portion positioned adjacent and distal to the head and substantially centered about the longitudinal axis, the smooth shank portion having a first diameter,
        a threaded shank portion positioned distal to the smooth shank portion and substantially centered about the longitudinal axis, the threaded shank portion including a male thread which is sufficiently strong to have a swage collar of a softer material swaged onto it without appreciable damage to the threads and having a second diameter smaller than the first diameter of the smooth shank portion,
        a pin tail portion positioned distal to the threaded shank portion and substantially centered about the longitudinal axis, the pin tail portion including means for a tool to engage the pin tail portion and pull the fastener in tension and having a third diameter which is smaller than the second diameter of the threaded shank portion, wherein a swage collar which is intended to be engaged with the threaded shank portion of the fastener fits over the pin tail portion without any interference, and
        a breakneck groove having a fourth diameter which is smaller than the third diameter of the pin tail portion, the breakneck groove being positioned between the threaded shank portion and the pin tail portion and substantially centered about the longitudinal axis, the breakneck groove being controlled to ensure that the breakneck groove includes a lower tensile strength than any other portion of the fastener and that the fastener will sever at the breakneck groove when a preset range of tension is applied to the fastener at the pin tail portion, the tensile strength of the breakneck groove being controlled through the fourth diameter of the breakneck groove and the strength of the fastener material in the region of the breakneck groove;

providing at least one workpiece, the at least one workpiece having a hole therethrough which provides a clearance fit with the smooth shank portion of the fastener;

inserting the pin tail portion of the fastener into the hole within the at least one workpiece from a first side of the at least one workpiece and advancing the fastener distally until the pin tail portion protrudes from a surface on a second side of the at least one workpiece and a distal surface on the head of the fastener contacts a surface on the first side of the at least one workpiece;

providing a swage collar having a substantially smooth interior surface which provides a clearance fit between the swage collar and the threaded shank portion;

sliding the swage collar proximally over the pin tail portion and threaded shank portion of the fastener until the swage collar is positioned proximate the second side of the at least one workpiece;

engaging the pin tail portion with a tool;

pulling the fastener distally in tension through the use of the tool;

pushing the swage collar proximally against the second side of the at least one workpiece through the use of the tool;

swaging the swage collar onto the threaded shank portion of the fastener through the use of the tool until the swage collar substantially fills the threads on the threaded shank portion; and increasing tension at the pin tail portion of the fastener through the use of the tool until the preset range of tension has been attained and the fastener severs at the breakneck groove.

2. A method of installing a fastener into at least one workpiece, comprising:

providing a fastener having,
an enlarged protruding head positioned at a proximal end of the fastener and substantially centered about a longitudinal axis,
a substantially cylindrical smooth shank portion positioned adjacent and distal to the head and substantially centered about the longitudinal axis, the smooth shank portion having a first diameter,
a threaded shank portion positioned distal to the smooth shank portion and substantially centered about the longitudinal axis, the threaded shank portion including a male thread having a second diameter smaller than the first diameter of the smooth shank portion,
a pin tail portion positioned distal to the threaded shank portion and substantially centered about the longitudinal axis, the pin tail portion including means for a tool to engage the pin tail portion and pull the fastener in tension and having a third diameter which is smaller than the second diameter of the threaded shank portion, wherein a female threaded device which is intended to be engaged with the threaded shank portion of the fastener fits over the pin tail portion without any interference, and
a breakneck groove having a fourth diameter which is smaller than the third diameter of the pin tail portion, the breakneck groove being positioned between the threaded shank portion and the pin tail portion and substantially centered about the longitudinal axis, the breakneck groove being controlled to ensure that the breakneck groove includes a lower tensile strength than any other portion of the fastener and that the fastener will sever at the breakneck groove when a preset range of tension is applied to the fastener at the pin tail portion, the tensile strength of the breakneck groove being controlled through the fourth diameter of the breakneck groove and the strength of the fastener material in the region of the breakneck groove;

providing at least one workpiece, the at least one workpiece having a hole therethrough which provides a clearance fit with the smooth shank portion of the fastener;

inserting the pin tail portion of the fastener into the hole within the at least one workpiece from a first side of the at least one workpiece and advancing the fastener distally until the pin tail portion protrudes from a surface on a second side of the at least one workpiece and a distal surface on the head of the fastener contacts a surface on the first side of the at least one workpiece;

providing a female threaded device;

sliding the female threaded device proximally over the pin tail portion;

engaging the pin tail portion with a tool;

pulling the fastener distally in tension through the use of the tool;

preventing the fastener from turning through the use of the tool;

torquing the female threaded device onto the threaded shank portion through the use of the tool until a desired torsional load is attained; and increasing tension at the pin tail portion of the fastener through the use of the tool until the preset range of tension has been attained and the fastener severs at the breakneck groove.

3. A method of installing a fastener into at least one workpiece, comprising:

providing a fastener having,
an enlarged protruding head positioned at a proximal end of the fastener and substantially centered about a longitudinal axis,
a substantially cylindrical smooth shank portion positioned adjacent and distal to the head and substantially centered about the longitudinal axis, the smooth shank portion having a first diameter,
a threaded shank portion positioned distal to the smooth shank portion and substantially centered about the longitudinal axis, the threaded shank portion including a male thread having a second diameter smaller than the first diameter of the smooth shank portion,
a pin tail portion positioned distal to the threaded shank portion and substantially centered about the longitudinal axis, the pin tail portion including means for a tool to engage the pin tail portion and pull the fastener in tension and having a third diameter which is smaller than the second diameter of the threaded shank portion, wherein a female threaded device which is intended to be engaged with the threaded shank portion of the fastener fits over the pin tail portion without any interference, and
a breakneck groove having a fourth diameter which is smaller than the third diameter of the pin tail portion, the breakneck groove being positioned between the threaded shank portion and the pin tail portion and substantially centered about the longitudinal axis, the breakneck groove being controlled to ensure that the breakneck groove includes a lower tensile strength than any other portion of the fastener and that the fastener will sever at the breakneck groove when a preset range of tension is applied to the fastener at the pin tail portion, the tensile strength of the breakneck groove being controlled through the fourth diameter of the breakneck groove and the strength of the fastener material in the region of the breakneck groove;

providing at least one workpiece, the at least one workpiece having a hole therethrough which provides an interference fit with the smooth shank portion of the fastener;

inserting the pin tail portion of the fastener into the hole within the at least one workpiece from a first side of the at least one workpiece and advancing the fastener distally until the pin tail portion protrudes from a surface on a second side of the at least one workpiece;

engaging the pin tail portion with a tool;

pulling the smooth shank portion of the fastener distally into the hole within the at least one workpiece through the use of the tool which is engaged with the pin tail portion until a distal surface on the head of the fastener contacts a surface on the first side of the at least one workpiece;

increasing tension at the pin tail portion of the fastener through the use of the tool until the preset range of tension has been attained and the fastener severs at the breakneck groove;

providing a female threaded device; and torquing the female threaded device onto the threaded shank portion through the use of the tool until a desired torsional load is attained.

* * * * *